United States Patent [19]

Griffin

[11] Patent Number: 4,983,651

[45] Date of Patent: Jan. 8, 1991

[54] DEGRADABLE PLASTICS

[75] Inventor: Gerald J. L. Griffin, London, England

[73] Assignee: Epron Industries Limited, England

[21] Appl. No.: 182,949

[22] Filed: Apr. 18, 1988

[30] Foreign Application Priority Data

May 21, 1987 [GB] United Kingdom ............... 8712009

[51] Int. Cl.$^5$ .................... C08L 3/00; C08F 8/00; C08G 63/48; C08G 63/91
[52] U.S. Cl. ........................ 524/47; 524/56; 525/55; 525/191; 525/232; 525/236; 525/237; 525/240; 525/241
[58] Field of Search .............. 524/17, 35, 47, 56; 525/55, 191, 232, 236, 237, 240, 241

[56] References Cited

U.S. PATENT DOCUMENTS

| | | | |
|---|---|---|---|
| 2,027,962 | 1/1936 | Currie | 264/230 |
| 2,623,025 | 12/1952 | Dearing | 524/14 |
| 3,276,899 | 10/1966 | Muhlberg | 428/326 |
| 3,329,509 | 7/1967 | Julius | 523/100 |
| 3,361,690 | 1/1968 | Gregory | 524/16 |
| 3,468,724 | 1/1970 | Donermeyer | 524/48 |
| 3,634,562 | 1/1972 | Kole | 264/41 |
| 3,767,604 | 10/1973 | Hjermstad | 524/50 |
| 3,797,690 | 3/1974 | Taylor | 220/1 R |
| 3,867,324 | 2/1975 | Clendinning | 523/126 |
| 3,949,145 | 4/1976 | Otey | 428/423 |
| 3,952,347 | 4/1976 | Comerford | 524/47 |
| 4,016,117 | 4/1977 | Griffin | 524/47 |
| 4,021,388 | 5/1977 | Griffin | 524/47 |
| 4,026,849 | 5/1977 | Bagley | 524/47 |
| 4,082,903 | 4/1978 | Chow | 428/514 |
| 4,125,495 | 11/1978 | Griffin | 524/47 |
| 4,218,350 | 8/1980 | Griffin | 524/47 |
| 4,420,576 | 12/1983 | Griffin | 524/47 |

FOREIGN PATENT DOCUMENTS 1161009 1/1964 Fed. Rep. of Germany .

OTHER PUBLICATIONS

Polymer Blends, ed. D. R. Paul, Academic Press, 1978, pp. 69–71 and 73.
Westhoff, Starch-filled Polyvinyl Chloride Plastics—Preparation and Evaluation, Ind. Eng. Chem., Prod. Res. Development, vol. 13, No. 2, 1974, pp. 123–125.

*Primary Examiner*—Nathan M. Nutter
*Attorney, Agent, or Firm*—Laff, Whitesel, Conte & Saret

[57] ABSTRACT

A degradable polymer composition is disclosed which comprises a blend of a normally stable chemically saturated polymer, such as polyethylene, a less stable chemically unsaturated polymer or copolymer, such as a styrene/butadiene block copolymer, or natural rubber, an antioxidant active over a limited period and a latent pro-oxidant, such as an organic salt of a transition metal, e.g. cobalt naphthenate. The presence together of the anti-oxidant and the pro-oxidant give rise to a period of induction before a sharp loss of physical strength occurs, whereby the period of induction can be exploited as the effective working life of the polymer composition. The polymer composition preferably also includes filler particles of a directly biologically sensitive material such as natural starch, a derivative of natural starch, a natural protein or a natural cellulose product or a powdered sugar of melting point higher than the processing temperature of the host polymer composition, whereby, the biological breakdown, in natural environments or in the especially biologically active surroundings of composting urban garbage, of the molecular fragments created by the onset of oxidative scission of the molecular chains of the chemically saturated polymer is accelerated by the presence of said filler particles.

11 Claims, 2 Drawing Sheets

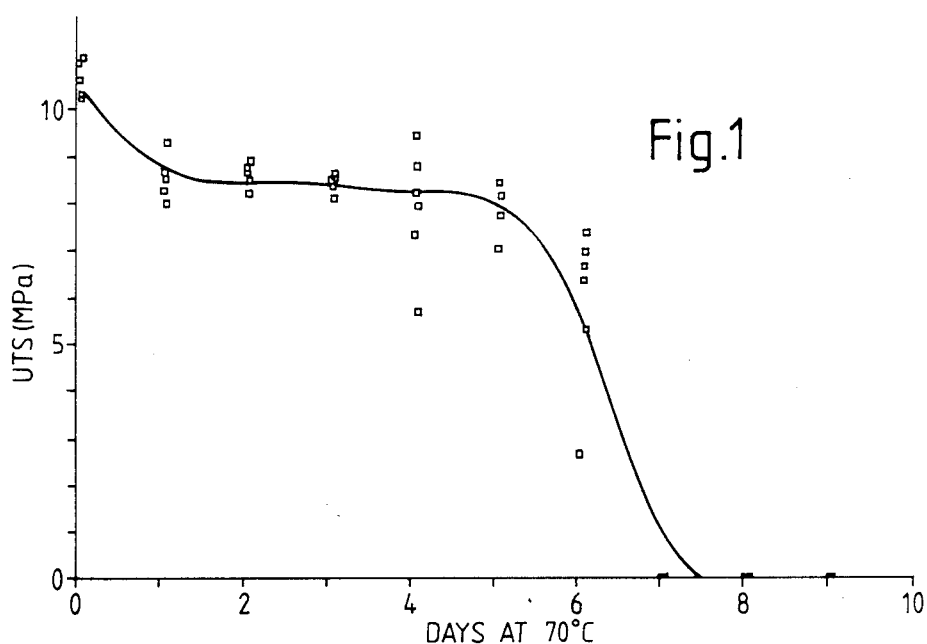
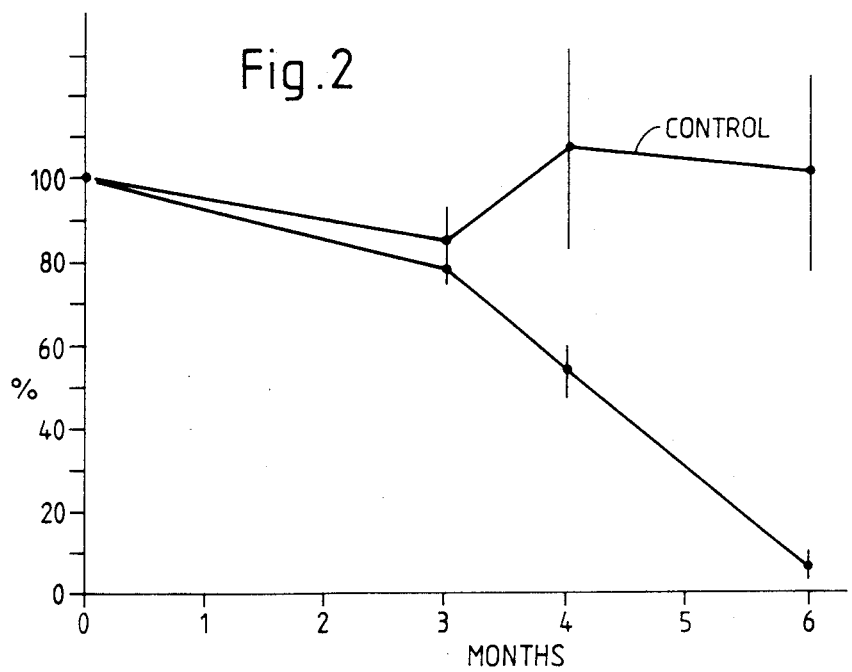

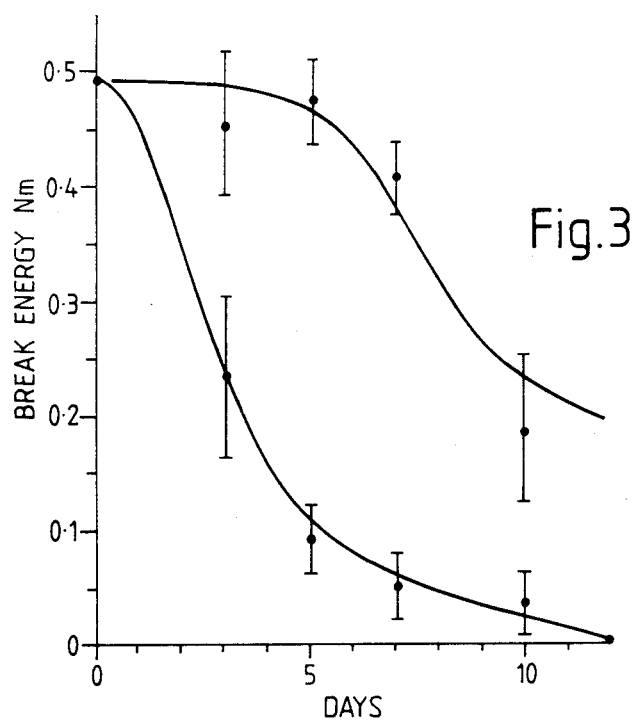
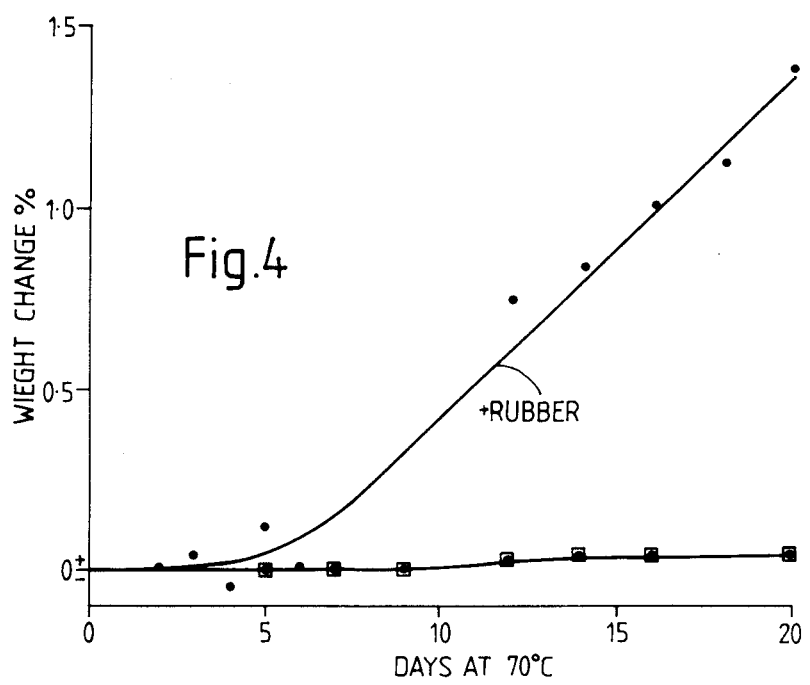

DEGRADABLE PLASTICS

FIELD OF THE INVENTION

This invention relates to degradable synthetic polymer compositions.

BACKGROUND OF THE INVENTION

Many packaging items such as bags and containers are destined, after a relatively short functional life, to arrive as a significant component of urban garbage or, to a much lesser extent, in the form of litter. Increasingly, such packaging items are being manufactured from plastics, that is to say from synthetic polymer compositions, which, whilst being cheap and having the physical properties which make them highly suitable for such packaging purposes, have the disadvantage, as components of waste or garbage, of being highly resistant to destruction by the chemical and physical actions to which they are subject in the natural environment and thereby such components constitute a mounting nuisance.

It is generally accepted that over 50% of the annual tonnage of all manufactured synthetic polymers are applied as packaging materials and that some 90% of this flow finishes as a component of urban garbage.

It has already been proposed that synthetic polymer compositions intended for packaging and the like purposes should be capable of being broken down chemically and physically by environmental action to which items made from such compositions become subject as litter. For example, it has been proposed that such compositions should be capable of being broken down biologically, i.e. should be 'biodegradable'.

It has hitherto been acceptable to use the term 'biodegradable' to describe polymer materials which might be environmentally acceptable when used as 'one-trip' packaging materials but it is now clear that the chemical and physical processes at work in the interaction between the environment and these materials are more complex than was originally believed. Biodegradability can be defined as the degradation at the molecular level of substances by the action of enzymes themselves derived from the metabolic processes of micro-organisms. Such very specific interactions as have long been familiar in the case of natural polymers, for example that between cellulose and wood-decaying fungi, can be cited. In the field of synthetic polymers one can also find examples such as the destruction of certain polyester type polyurethanes by fungi, in particular Ulocladium chartarum.

Restricting consideration to that group of synthetic polymer types which are in general use in the packaging industry we find that these polymers are unaffected by enzymes derived from micro-organisms. A careful examination of circumstances in which such polymers appear occasionally to have been degraded by biological action has disclosed a high probability in each case that the process of degradation has proceeded in at least two stages, the first being chemical and resulting in a reduction of the molecular weight of some part of the polymer to a point at which the second, biological, stage can commence as an interaction between the micro-organisms of the environment and the low molecular weight material that has appeared. It is also recognised that the first, chemical, stage of this degradation process can follow different mechanisms which can be broadly classified under two headings the first being photochemical oxidative chain scission, and the second chemical catalytic oxidative chain scission.

SUMMARY OF THE INVENTION

Accepting that it is an increasingly important factor in preserving the quality and stability of the human environment that the packaging industry should be provided with materials of controlled degradability, it is an object the present invention to provide a synthetic polymer capable of undergoing degradation under the conditions to which items made therefrom are subject when they form a component of garbage disposed of by the landfill or composting route of garbage disposal.

Clearly in the case of buried materials it is not possible to rely upon photochemical processes to form any part of a degradation process. Accordingly, and accepting the need imposed by the economics of the situation to restrict the range of polymers to those synthetics already in use in the packaging industry, it is proposed, in accordance with the preferred embodiments of the present invention, to combine familiar packaging polymers with catalytic systems which will initiate the chemical oxidation stage at a point in time roughly coincident with the disposal of the packages as waste. Desirably, subsequent oxidative and biological interactions should then proceed in such a manner that after a period of 6 to 12 months the materials would, as a result of their advanced degradation, be impossible to retrieve from a typical landfill mass without fragmentation. Small fragments of polymeric materials are accepted as innocuous components of the soil in respect of the absence of any associated phytotoxic effects or interference with the quality of drainage water. There would also be no mechanical interference with agricultural or civil engineering activities by such small residual fragments.

According to one aspect of the invention, there is provided a degradable polymer composition which incorporates a normally stable chemically saturated polymer, a less stable chemically unsaturated compound in the form of a polymer or copolymer, and an anti-oxidant active over a limited period, whereby, on depletion of the anti-oxidant, and in the presence of a pro-oxidant a sharp loss of physical strength will occur as a result of oxidative action.

According to another aspect of the invention there is provided a degradable polymer composition which comprises a blend of a normally stable chemically saturated polymer, a less stable chemically unsaturated compound in the form of a polymer or copolymer, an anti-oxidant active over a limited period and a latent pro-oxidant, the presence together of the anti-oxidant and the pro-oxidant giving rise to a period of induction before a sharp loss of physical strength occurs, whereby the period of induction can be exploited as the effective working life of the polymer composition.

The stable polymer is preferably a polyethylene such as low-density polyethylene, linear low-density polyethylene or high density polyethylene. Alternatively, the stable polymer may be polypropylene or polystyrene. The associated unsaturated compound may be an elastomer of the type made by the polymerisation of 1:4 dienes, or the copolymerisation of such 1:4 dienes with ethenoid comonomers.

Preferred compositions embodying the invention form a class of polymer formulations, the lifetime of which is divided into two zones. This is achieved by exploiting the phenomenon of the induction period which can be noted when an oxidation sensitive material is protected by selected types of protective chemical additives generally called anti-oxidants. Such additives are a normal ingredient of most packaging polymer formulations, being required initially to protect the polymer during the extreme thermal stresses of compounding and conversion processing. The inventor has found that by selecting types and concentrations of anti-oxidants and pro-oxidants in compositions in accordance with the invention, systems can be produced which, whilst being adequately stable for the duration of the essentially anaerobic conversion processing in enclosed machinery such as extruders, will subsequently reach the point at which the anti-oxidant is expended and the system enters into its second time zone during which oxidation takes place. This oxidation ideally commences after a passage of time which, at normal room temperature, safely exceeds the normal functional life of such products.

It will be appreciated that upon the introduction of plastic products into buried or composted urban garbage the conditions change dramatically as compared with the normal, "on shelf" conditions prior to disposal. In the upper layers of burial sites where the conditions are aerobic, and in the windrows or cylinders of aerobic compositing systems, peak temperatures in the region of 70° Centigrade are reached in two or three days, and usually then decline only slowly reaching, perhaps, 55° after two months. Reports from various studies are remarkably consistent on this thermal behaviour and the information to be found in "Handbook of environmental control, Vol. II, Solid waste" edited by R.G. Bond and C.P. Straub and published by the CRC Press of Ohio is typical. At the beginning of the second time zone polymer formulations, embodying the present invention, with their anti-oxidant content mostly consumed by the protection demands of the processing operation, are thus exposed, when forming part of garbage thus disposed of by burying or composting, to temperatures some 50° Centigrade higher than in their normal service condition. The temperature jump will be even higher for material which has been used for food packaging and will have been under refrigeration for part of its functional life. Because the oxidative step is entirely chemical in nature, the process will continue at the elevated temperature with a greatly increased velocity, for chemical processes generally double their rate for each 10° C. elevation in temperature. Numerous experimental trials conducted in laboratory ovens or in a miniature composting unit have confirmed these expectations. In order to achieve a sufficiently rapid rate of chemical chain breaking with the attendant loss of physical properties it has been found desirable to include in the compositions embodying the invention substances capable of autoxidation because such substances are more readily initiated into the oxidation process by virtue of their unsaturation and, once initiated, the chemical processes can involve the more resistant saturated molecular structures of the common packaging thermoplastics such as the polyolefines.

It is preferred to use, as the unsaturated polymeric component of a composition embodying the invention, natural rubber or particular styrene-butadiene elastomers which not only provide adequate levels of autoxidisable unsaturation but also greatly improve some of the physical properties of the products especially their impact strength. Transition metal salts are preferred as pro-oxidants for these degradable compositions and it has been found that, provided that the anti-oxidant and pro-oxidant types and ratios are correctly selected and adhered to, then transition metal compounds capable of the oxygen transfer chemistry can be incorporated into polymer compositions jointly with anti-oxidant ingredients in the compounding operation.

The transition metal salts used in preferred embodiments are salts formed by combining transition metals such as cobalt, manganese and copper with organic acids of sufficiently high molecular weight to give salts soluble in the host polymer blends used.

The term "transition metal" as used herein means an element having greater than 8 and less than 18 electrons in the outer group of the ion. Transition metals are thus usually capable of electron transitions between their outer shells and the variable valency states resulting render them capable of inducing oxidation reactions. In practice, those transition elements which are highly toxic, radioactive, are extremely rare and costly are not normally encountered in industrial use as oxidation catalysts. Typical transition metals whose salts and complexes do feature in such applications and could be considered for use in carrying out the present invention are Ce, Zn, Cu, Ag, Ni, Co, Fe, Mn, Cr, and V. They would be used as such of their salts as display an adequate level of solubility in polymer melts, typically stearates, oleates, behenates, myristates, erucates, linoleates, or naphthenates, or complexes such as acetonylacetates, 8-hydroxyquinolinates, metalammine salt complexes and the like.

In compositions embodying the invention the transition metal salts may be used in quantities such as to provide from 0.001% to 1% by weight of the metal in the composition, depending upon the desired oxidation rate.

In embodiments of the invention, the anti-oxidant used is generally that incorporated as a matter of course in the manufacture of the respective chemically saturated polymer. Thus, commercially supplied polyolefine materials are normally sold containing a variety of well established anti-oxidants and any of these anti-oxidants can be used in the compositions of this invention. Typical of such anti-oxidants is the ICI product Topanol (4-methyl-1, 6-di(2-hydroxy-3-tertbutyl-5-methylbenzyl)phenol used for stabilising most low-density polyethylene (LDPE) materials.

The proportion of the unsaturated polymer or copolymer in a composition embodying the invention may be in the range 0.5% to 50% by weight of the composition, preferably between 2% and 15% in order to balance the factors of cost, adequate oxidation effect, and adequate restoration of strength loss due to the presence of starch where used. In embodiments where starch is incorporated in the composition, the starch content may be from 0.5 to 50% by weight of the composition, although mechanical strength of the composition at the higher end of this range tends to be low. Preferably the starch content is from 2% to 15% by weight of the composition.

As noted above, when items formed from compositions embodying the invention are buried or composted with other garbage, degradation commences early in the second time zone, with oxidation following depletion of the anti-oxidant. Also commencing early in the second time zone is the interaction between the microorganisms occurring profusely in the garbage environment and the partly oxidised polymers. It has been observed that the inclusion of particulate organic fillers such as starch into synthetic polymer formulations can have an accelerating effect on the biological breakdown of those polymers which are themselves intrinsically sensitive to direct enzyme chain scission. In order, therefore, to accelerate the biological interactions between the scission products arising from the oxidation stage as and when they arise in the second time zone of the behaviour of the products here described it is proposed to incorporate appropriate types and quantities of starch following technology that has been extensively described by the inventor—e.g. "Starch Granules—Their Properties and Applications"—New Approaches to Research on Cereal Carbohydrates—R.D. Hill and L. Munck, published by Elsevier, Amsterdam, 1985,—pp 201-210. Such additions would be omitted in those cases where high clarity was essential in the products.

Examples of compositions are set out in the following examples, by way of illustration.

BRIEF DESCRIPTION OF THE DRAWINGS In the Drawings:

FIG. 1 is a graph illustrating variation of ultimate tensile strength (UTS) with time for a first composition embodying the invention, FIG. 2 is a graph illustrating variation of percentage strength retention with time for a second composition embodying the invention and a control material not embodying the invention, FIG. 3 is a graph illustrating variation of break energy for standardised samples, with incubation time of the material, for two different compositions embodying the invention and illustrating the effect of varying the percentage of pro-oxidant, and FIG. 4 is a graph showing weight change, as an indication of oxidation, over a period of time, and illustrating the effect of the incorporation of natural rubber, as the unsaturated polymer, in a composition embodying the invention, as contrasted with a material which is of substantially the same composition apart from the omission of rubber.

EXAMPLE I

Polyethylene of melt flow index 2 and density 0.916, which would have contained a normal complement of heat stabiliser, was hot compounded on a two-roll mill at 150° Centigrade with its own weight of maize starch which had previously been oven dried to about 1% moisture content. The hide stripped from the mill was cooled and cut into granules to provide a starch masterbatch. Further polyethylene of melt flow index 2 and density 0.916 was compounded on the mill with its own weight of a granular block copolymer of styrene and butadiene containing 40% of styrene and reported by its manufacturers, Phillips Petroleum, to have a molecular weight of 130,000. The hide stripped from the mill was again cooled and cut into granules to provide a synthetic rubber masterbatch. Using the two masterbatches prepared as described above along with further polyethylene of melt flow index 2 and density 0.916 a cold mix of granules was prepared containing 10% of dry starch and 5% of the synthetic rubber. During the mixing operation a quantity of a solution of cobalt naphthenate in white spirit was added calculated to provide a cobalt concentration of 0.01% in the total mix by virtue of the cobalt content of the white spirit solution being 10%. A pilot plant for film blowing was set up working with the same polyethylene grade as was used for the blend of masterbatches so that the film thickness was close to 50 micrometers and, when the operating conditions were stable, the feed hopper was emptied and the cold blend of masterbatches and polyethylene was introduced into the hopper. The operation of the machine continued undisturbed by the change of material and it was easy, knowing the characteristics of the particular machine, to collect film samples which had essentially the same composition as the feed blend material. Samples were cut from this film for test purposes some of which were tested for tensile properties immediately and others suspended in an incubator maintained at 70° Centigrade with internal forced air circulation so that samples could be withdrawn every 24 hours for testing. The test temperature was chosen as representative of typical thermal conditions in garbage composting. Standard shape dumb bell samples were punched from the samples and they were tested essentially in accord with ASTM D.882-64T. It was very obvious that the tensile behaviour of the incubated material changed very little for about one week at the end of which time its ultimate tensile strength collapsed to a level so low that it could not be measured in the customary equipment. At the end of a further week the samples could not be picked up in the fingers without crumbling into fragments. It was also noted that whereas in a separate trial in which the starch was included but the styrene-butadiene block copolymer was omitted the initial ultimate tensile strength of the extruded starch-filled film was reduced by about 20% as compared with a corresponding film extruded from the basic polyethylene material whereas in the film extruded from polyethylene containing both starch and synthetic rubber the initial ultimate tensile strength was only reduced by about 5% as compared with the corresponding film extruded from the basic polyethylene material. All the tensile measurements described above were made parallel to the extrusion direction of the films to ensure proper comparative values and as shown in the appended drawing, the results have been reduced to graphical form with a line fitted by regression analysis to the data in order to demonstrate the induction period followed by a dramatic loss of physical strength.

EXAMPLE II

A roll of 50 micron thick low density polyethylene film was prepared exactly as described in Example I using the same formulation. From the roll rectangular sample pieces were cut measuring about 8 cms by 20 cms in such a manner as to ensure that the extrusion direction of the film coincided in every case with the longer dimension of the test pieces thus ensuring that the subsequent strength measurements were strictly comparable in terms of possible extrusion orientation effects. In order to expose these film samples to comparable soil burial conditions they were all interred in the same plot of earth. This plot was created by clearing a mature loam garden bed in the County of Surrey, U.K., of the previous year's growth, sieving the soil to a depth of about 20 cms through a ¼ inch riddle to remove large stones, raking the surface smooth to avoid the local collection of rainwater, and providing a horizontal wire mesh screen held clear of the surface by a light wooden frame to prevent digging or burrowing by cats, dogs, or rabbits. The plastic film samples were buried individually in the test plot with each sample set on edge to ensure free drainage of water and to ensure all-round contact with the earth. The top edge of each sample was about 5 cms below the surface of the earth. Control samples of LDPE film extrusion blown at the same thickness and from the same base polymer but without the starch, elastomer and prodegradant (pro-oxidant and starch) additives were buried at the same time and in the same manner. All the test samples were buried on the same day in the month of May and groups of samples were removed from the plot at intervals as required for testing. The disinterred samples were washed free of adhering soil particles and dried by exposing them in the test room environment at about 50% relative humidity after blotting them free from surface moisture.

Dumb-bell test pieces were punched from the samples in the usual manner which test pieces were then tested for tensile properties following the procedure of ASTM D882-64T. The results, see FIG. 2, are there shown as a graphical plot of percentage tensile strength retention against time of burial in months and demonstrate clearly that the control samples remain virtually unchanged after six months burial whereas the compositions made degradable following the methods of the present invention maintain their strength for an induction period of about three months followed by a rapid loss of strength. No measurements could be carried out on samples buried for a longer period because they were too weak to ensure the procedure of cleaning and test piece preparation. Each point plotted in FIG. 2 shows the mean of five test results and the mean deviation errors bar are added.

EXAMPLE III

In order to demonstrate the effect of varying the concentration of pro-oxidant transition metal salt additive in polymer compositions as proposed in this invention, two low density polyethylene films were prepared again following the formulation and procedure of Example I only now the pro-oxidant catalyst used was manganese stearate. In the first film sample the amount of manganese stearate added was such as to produce a manganese concentration of 0.05% by weight in the finished film whilst in the second sample the addition of manganese stearate was such as to produce a concentration of 0.005% by weight of manganese in the finished film. Cut samples from these two films measuring about 8 cms by 20 cms were suspended freely in an air circulated incubator maintained at an air temperature of 70° Centigrade plus or minus 1° Centigrade. Samples of both types of film were removed at convenient intervals, dumbbell samples punched, and their tensile properties measured following the procedures of ASTM D882-64T. The load/elongation curves were recorded using an XY recorder linked to the analogue voltage outputs of the tensile testing machine and the areas of these curves measured using an image analysing device. From these areas it was possible to calculate the energy taken to stretch and break the individual samples and these values, normalised to the basis of a 50 micron film in each case to compensate for small variations in the thicknesses of individual films, are shown plotted against incubation time at 70° Centigrade in FIG. 3. The curves, in this case, have been fitted using standard regression analysis computer procedures and demonstrate once again the pattern of oxidative degradation following an induction period. It is clear that very wide control over the time to commence degradation can be exercised by varying the concentration of manganese salt. Applying the rule that the reaction time doubles for 10° Centigrade temperature rise, if the samples had been exposed at 20° rather than 70° Centigrade then their ambient temperature life expectancy would have been increased by a factor of 32 over the incubator exposure life, i.e. about ten months. The outdoor soil burial tests reported in Example II appear to confirm this prediction.

The technique of plotting breaking energy against time of exposure to test conditions has the advantage that it takes into account both the loss in tensile strength and the reduction of elongation at break which are commonly observed consequences of the oxidative degradation processes.

EXAMPLE IV

To demonstrate the importance of the unsaturated polymer additive in the formulations of this patent two low density polyethylene films were made exactly as described in Example I but with the use of copper stearate as the pro-oxidant catalyst. In both of these films an amount of copper stearate was added which established a concentration of copper of 0.05% by weight. In one sample only natural rubber was added to the extent of 5% by weight and no unsaturated polymer was added to the second film sample. Natural rubber was selected for this demonstration because it contains no added anti-oxidant, thus both samples, in the actual film, will contain the same amount of anti-oxidant derived in both cases only from the low density polyethylene used. A small dilution effect will have been caused by the addition of the 5% of rubber but this is insignificant.

Samples of these two films were cut, about 8 cms by 20 cms and suspended freely in an air circulated incubator held at 70° Centigrade plus or minus 1° Centigrade. At the same time every succeeding day these samples were removed from the incubator, handled only with tweezers, allowed to cool, and then weighed on an analytical balance sensitive to 0.0001 grammes. The process of oxidation can be readily made apparent using this technique and the percentage weight changes are shown plotted against time of incubation in FIG. 4. Again the induction period is made obvious in the sample containing both copper catalyst and natural rubber which sample started to oxidise rapidly after five days of incubation, but the sample with copper only and no rubber is seen to be oxidising extremely slowly. The sample without rubber, at the end of the incubation period, was still flexible and strong but the sample containing both copper catalyst and rubber could be pulled apart by light finger tension.

It is envisaged that for certain applications, the pro-oxidant, such as a transition metal salt, may be omitted from the polymer composition, and the presence of iron salts in the soil, or in the other garbage with which packaging or the like made from the polymer composition is buried or composted may be relied upon to promote oxidation of the unsaturated polymer or copolymer in the composition blend whereby degradation may be initiated by the act of burying or composting the garbage.

A composition embodying the invention may be made into a degradable product comprising a thin film or sheet adapted for the manufacture of bags and wrappings, the thin film or sheet having been formed by extrusion, extrusion blowing, film casting or calendering the polymer composition. A composition embodying the invention may alternatively be formed into three-dimensional objects such as containers or vessels, or disposable utility items, by injection moulding, blow moulding, compression moulding, thermoforming or rotational casting of the polymer composition.

I claim:

1. A composition for preparing biodegradable articles comprising a blend of
   a stable polymer selected from the group consisting of polyethylene, polypropylene and styrene;
   an anti-oxidant;
   starch;
   a butadiene-styrene copolymer; and
   a transition metal organic salt selected from the group consisting of the metal salts of stearate, oleate, behemate, myristate, erucate, linoleate, napthenate, acetonyl acetate, hydroxyquinolinate and metalamine.

2. The composition of claim 1 comprising polyethylene; an anti-oxidant; 0.001–1.0% of a transition metal selected from the group consisting of Co, Mn and Cu wherein the transition metal is the metal salt of the organic compound selected from the group consisting of stearate and napthenate; 2–15% by weight of starch; and 2–15% by weight of said butadiene-styrene copolymer.

3. A biodegradable plastic article prepared from a composition comprising a blend of a saturated polymer selected from the group consisting of polyethylene, polypropylene and polystyrene; an unsaturated copolymer of butadiene-styrene; an anti-oxidant, a latent pro-oxidant and a filler.

4. The article of claim 3 wherein the filler is starch.

5. The article of claim 4 wherein the pro-oxidant is an organic transition metal salt.

6. The article of claim 5 wherein the transition metal is selected from the group consisting of Ca, Zn, Cu, Ag, Ni, Co, Fe, Mn, Cr and V; and the organic salt is selected from the group consisting of stearates, oleates, behearates, myristates, erucates, linaleates, napthenates, acetonylacetates, hydroxyquinolinates and metalaminine.

7. The article of claim 6 comprising 0.001–1.0% by weight of said transition metal, 0.5–50% by weight starch, 0.5–50% by weight of said butadiene-styrene copolymer.

8. The article of claim 3 comprising 0.5–50% by weight starch, 0.5–50% by weight of said butadiene-styrene copolymer.

9. The article of claim 3 comprising polyethylene; an anti-oxidant; 0.001–1.0% of a transition metal selected from the group consisting of Co, Mn and Cu wherein the transition metal is the metal salt of the organic compound selected from the group consisting of stearate and napthenate; 2–15% by weight of starch; and 2–15% by weight of said butadiene-styrene copolymer.

10. The article of claim 3 wherein the filler is selected from the group consisting of natural starch, a derivative of natural starch, a natural protein, a natural cellulose product and a powdered sugar of melting point higher than the processing temperature of the host polymer composition.

11. The article of claim 3 which is a thin film or sheet adapted for the manufacture of bags and wrappings.

* * * * *